Jan. 16, 1968        H. KELLNER        3,363,355

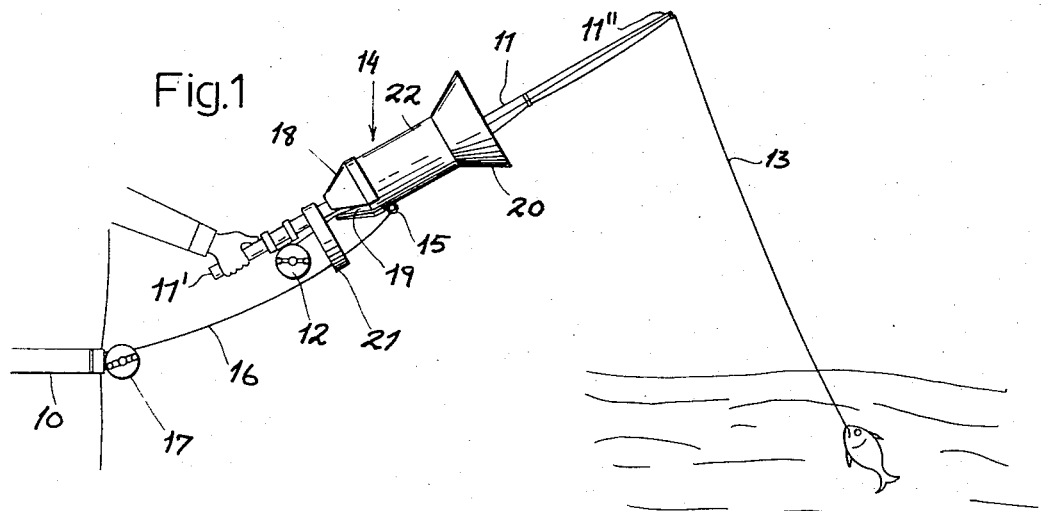
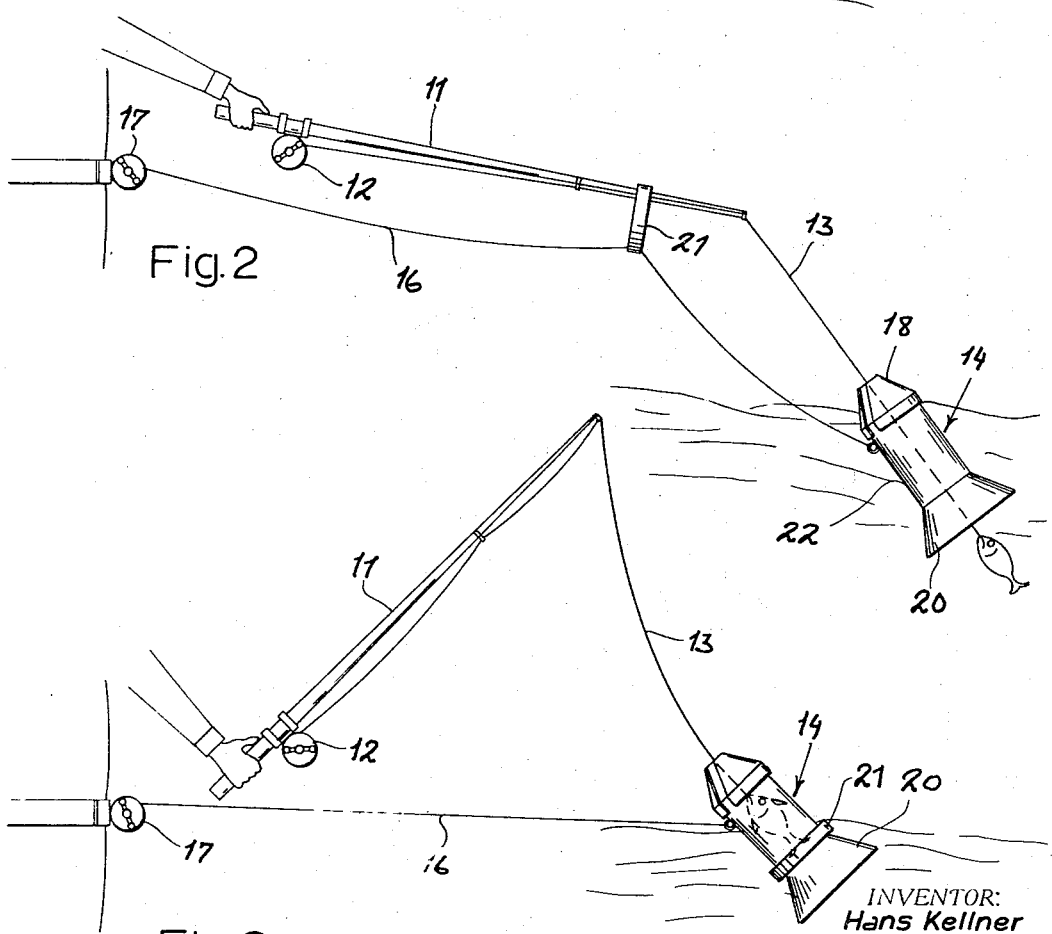

FISHERMAN'S GEAR

Filed Aug. 20, 1965        3 Sheets-Sheet 2

INVENTOR:
Hans Kellner

BY

Karl F. Ross
Attorney

Jan. 16, 1968  H. KELLNER  3,363,355
FISHERMAN'S GEAR
Filed Aug. 20, 1965
3 Sheets-Sheet 3
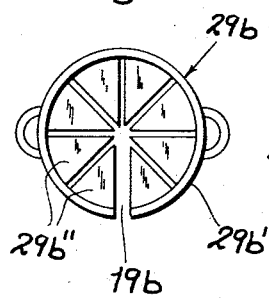
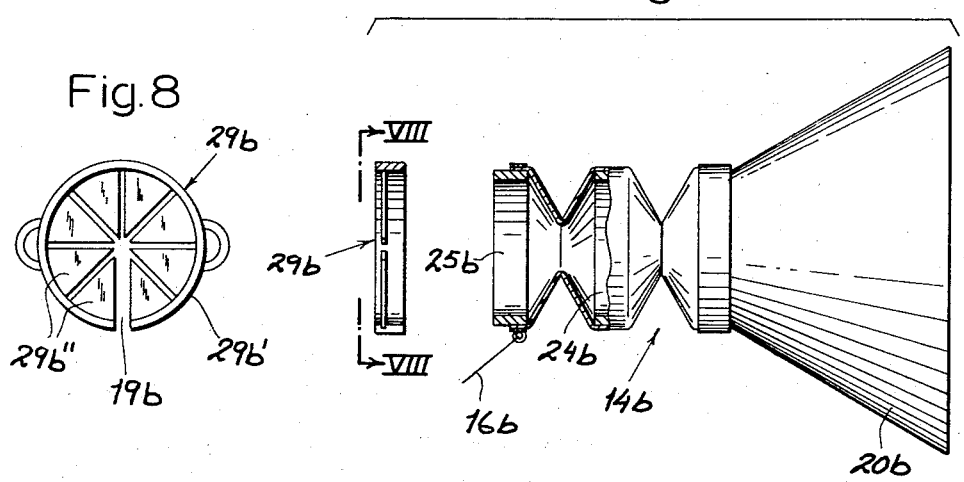
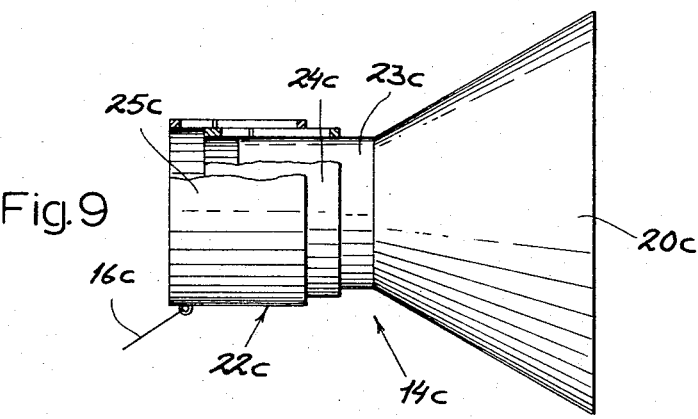
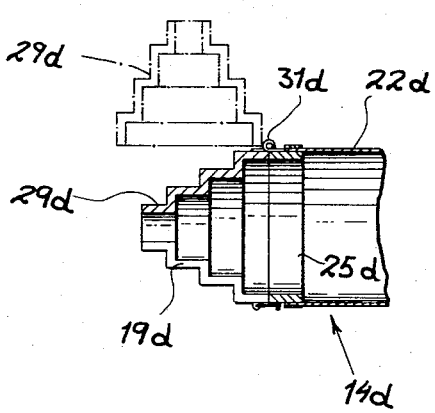
Hans Kellner
INVENTOR.
BY
Karl F. Ross
Attorney United States Patent Office 3,363,355
Patented Jan. 16, 1968

3,363,355
FISHERMAN'S GEAR
Hans Kellner, Jainzendorfstr. 2, Bad Ischl, Austria
Filed Aug. 20, 1965, Ser. No. 481,182
Claims priority, application Germany, Oct. 9, 1964,
K 54,215, Patent 1,209,353
14 Claims. (Cl. 43—5)

My present invention relates to a fisherman's gear, particularly adapted for fly casting, and has for its principal object the provision of means for simplifying the task of preventing the escape of a fish already hooked.

It is known to use fish traps provided with one-way inlets which let a fish enter the trap but prevent its subsequent escape therefrom. Such traps have heretofore been employed mainly for the catching of large numbers of small fish, e.g. minnows, and, as far as I know, have not yet been successfully utilized for individual catches in conjunction with conventional fishing rods. One reason for this nonuse appears to be that the trap, if permanently attached to the distal end of the rod (i.e. to the end remote from the one held by the fisherman), would unduly weight down that distal end and, in casting, may break the slender tip of the rod whose thickness, in the case of a fly rod, may be a fraction of a millimeter. If, on the other hand, the trap were permanently affixed to the line, it would impede the alternate hauling in and paying out of the line which fishermen use in "playing" a fish, i.e. in tiring it out before landing it.

It is, therefore, a more specific object of my invention to provide a combination fishing rod and fish trap which avoids the disadvantages just described.

In accordance with this invention I provide a fish trap of the general character set forth which can be removably fitted on the rod by way of the proximal end of the latter, i.e. the end held by the fisherman, and can be slid along the rod and the line past the distal end of the rod, with its one-way inlet facing away from the fisherman and thus from the proximal end he is holding. During casting and playing, this trap is detached from the rod and, advantageously, carried on the fisherman's belt by a suitable attachment. When needed, i.e. when the fisherman is ready to bring in his catch, the trap is slid over the proximal end of the rod and allowed to ride down the latter and the associated line into proximity with the fish which can then be drawn into its inlet. Thereafter the trap is hauled in, advantageously with the aid of a cord or other flexible link also anchored to the fisherman's belt.

In order to facilitate the sliding of the trap over the proximal end of the rod, which often is also equipped with a conventional line reel, my invention further provides for the presence of removable closure means on the side of the trap facing the fisherman. Such closure means may comprise a mechanical shutter or may be constituted by an array of inflatable wall elements normally withdrawn to clear the rod and the reel. The entire body of a trap, which preferably has a generally cylindrical shape, may be made collapsible for easier carrying, as by being inflatable, accordion-pleated (e.g. in the manner of a Chinese lantern) or telescoped.

According to a further feature of my invention, the body of a trap is provided with an outwardly diverging, preferably frustoconical extension beyond its inlet, this extension serving not only to direct the fish toward the inlet but also, particularly in the case of pleated or telescoped traps, to maintain the trap extended by the drag of the water against the pull of its connecting cord, wire or the like. In order to reduce this drag it may be desirable, pursuant to a still further feature of my invention, to perforate the frustoconical wall of this divergent extension.

The aforementioned extension may also be used as an abutment for an annular weight which can be slid over the cord and line onto the trap body to load it down, e.g. in order to counter-act the buoyancy resulting from the use of an air-inflated trap body.

Following are some of the advantages realized with a combination of rod and trap in accordance with this invention:

(a) The fisherman is entirely unhampered during casting since the rod has not yet been weighted down by the trap.

(b) The flexibility and resiliency of the rod is fully maintained and topheaviness is avoided.

(c) A fish on the hook can be played in the usual manner, without interference from the trap.

(d) Even a trap designed for the catching of large fish, e.g. of a length between 50 and 100 cm. can be readily carried on the fisherman's belt in a collapsed position.

(e) Once the fish is brought into a trap, it can be pulled with that trap from the water and will be prevented from escaping even if it has freed itself from the hook.

(f) The trap can be made, at least in part, of soft and flexible material (e.g. rubber) which will not injure the fish.

(g) Landing of the fish is made easy even when the fisherman stands on a pier, on a bridge or at some other elevated location.

These and other features and advantages of my present invention will become more fully apparent from the following description of certain embodiments, reference being made to the accompanying drawing in which:

FIG. 1 is a pictorial view of a fisherman's gear according to the invention in the initial stage of landing a fish;

FIGS. 2 and 3 are views similar to that of FIG. 1, showing subsequent stages;

FIG. 7 is a side-elevational view, partly in section, of a modified trap adapted to be used with the gear of FIGS. 1–3;

FIG. 8 is an end view of a shutter for the trap, taken on the line VIII—VIII of FIG. 7;

FIG. 9 is a partly sectioned side-elevational view of still another type of trap in a partly collapsed condition; and FIG. 10 is an axial sectional view of the rear end of a trap, showing an alternate type of shutter therefor.

Figure 4:
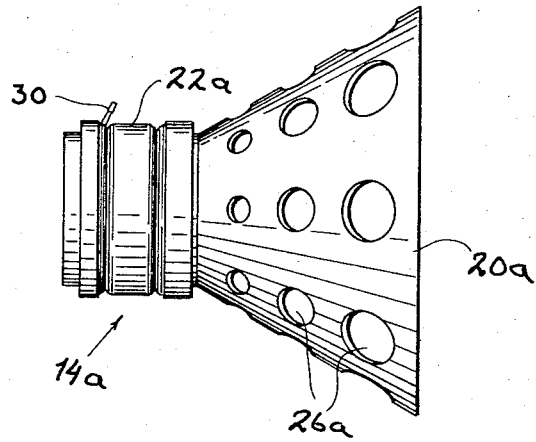
FIG. 4 shows, in side-elevational view, a collapsed inflatable fish trap adapted to be used in the gear of FIGS. 1–3.

In FIG. 1 a fisherman is seen wearing a belt 10 and holding a rod 11 equipped with the usual fishing reel 12, line 13 and hook (not shown) which has been swallowed by a fish. A fish trap 14 is slidably disposed on the rod 11 and carries an eye 15 by which it is tied, via a cord 16 and another reel 17, to the fisherman's belt 10. Trap 14, which is normally detached from the rod 11, may be carried on the belt 10 in any suitable fashion, e.g. via the reeled-in cord 16 or by other fasteners, such as the eye 15, engaging a hook (not shown) on the belt.

Trap 14 is provided, on its side facing fisherman, with a removable frustoconical closure member 18 having a lateral slit 19 which allows the member 18 to be fitted around the rod 11 after the trap has cleared the heavy proximal end 11' of the rod as well as the reel 12 by being slid from that end along the rod with the member 18 swung out or completely detached. A funnel-shaped intake extension 20 at the opposite end of the trap is turned toward the distal end 11'' of the rod and thus faces the fish after gliding past the end 11'' along the line 13, as illustrated in FIG. 2. This movement, brought about by a downward tilting of the rod 11 and a sufficient slackening of cord 16, takes place after the fish has been played long enough to lower its resistance whereupon reel 12 is operated to pull the fish in, as shown in FIG. 3. Generally, the trap 14 will be kept off the rod 11 during both casting and playing.

The cylindrical central body 22 of trap 14 may be made collapsible, in a variety of ways more fully described hereinafter, and in some instances (e.g. when distended by inflation) may have too much buoyancy to sink below the water surface under its own weight. In such event the trap 14 may be loaded down by a heavy ring 21 which is slid onto the rod 11 after the trap so as eventually to come to rest against the extension 20 thereof, as seen in FIG. 3; the initial separation of ring 21 from trap 14 has the advantage of allowing the fisherman to maneuver the trap somewhat more freely, in addition to reducing the deflection of the distal rod end 11'' as the trap slides out into the water. Following entrapment of the fish, the trap 14 can be hauled in via reel 17 and cord 16 without further straining of rod 11.

Figure 5:
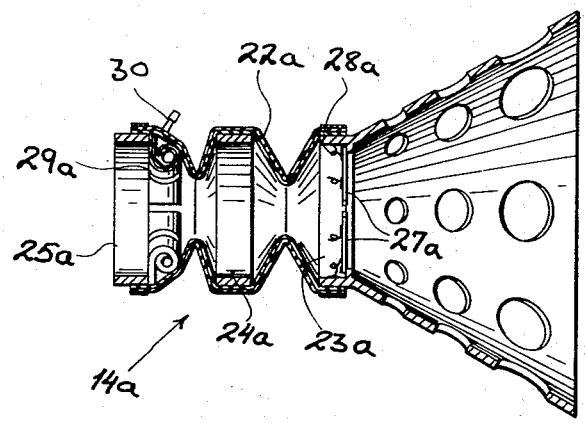
FIG. 5 is a longitudinal sectional view showing the trap of FIG. 4 in a partly inflated state.
Figure 6:
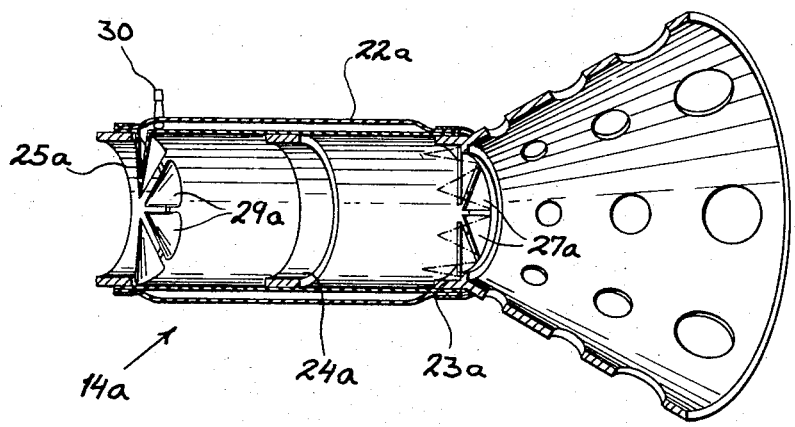
FIG. 6 is an isometric sectional view of the trap of FIGS. 4 and 5 in a fully inflated state.

Reference will now be made to FIGS. 4–6 where I have shown an inflatable device 14a adapted to be used as the trap of FIGS. 1–3. The body 22a of the trap is a double-wall rubber sheet provided with internal reinforcing rings 23a, 24a, 25a. Ring 23a is integral with funnel 20a which has been shown provided with numerous perforations 26a to reduce its drag within the water. This ring 23a also has mounted therein a set of yieldable flaps 27a which normally are maintained by relatively weak springs 28a in an obstructing position across the inlet defined by this ring but which readily pivot inwardly when a fish is hauled into the trap or enters some voluntarily.

The opposite or rearward ring 25a forms a seat for a further shutter 29a which may be used as a substitute or supplement for the frustoconical closure member of 18 of FIGS. 1–3 and which can be rendered inoperative when the fisherman wishes to reach into the trap to remove a fish or when the trap is not in use. As here shown, the shutter 29a consists of a series of sector-shaped hollow blades, generally similar to the flaps 27a which in their deflated state curl up is illustrated in FIG. 5 but which straighten out and complement one another to form a transverse wall when inflated. For this purpose the interior of each shutter blade 29a may communicate with the interior of trap housing 22a so that both may be inflated via a common nipple 30; naturally, separate nipples could be provided for the trap body and for the shutter. Nipple 30 may be equipped with conventional means for releasing the air from the housing wall and/or the self-retracting shutter blades.

FIG. 7 shows a modified trap 14b which is pleated between rings 24b, 25b and which can be distended, when lowered into the water, by the pull of cord 16b against the drag of funnel 20b which, as here shown, is not perforated. A shutter 29b, consisting of a ring 29b' supporting inwardly pointing rigid blades 29b'', removably fits onto the rear end of trap 14b defined by ring 25b; shutter 29b has a radial slot 19b to facilitate its positioning on the rod 11 (FIGS. 1–3) behind the trap as already described with reference to the cone 18.

FIG. 9 shows another modified trap 14c whose body 22c consists of several telescoped tubes 23c, 24c, 25c, the funnel-shaped extension 20c being integral with the innermost tube 23c. Again, as in the preceding embodiment, the body of the trap may be extended by pulling on the cord 16c against the drag of the divergent head 20c.

Finally, I have shown in FIG. 10 an alternate shutter 29d which is hinged at 31d to a ring 25d on the body 22d of a trap 14d (only partly illustrated) and which is a stepped cylindrical member slotted at 19d to clear the rod as heretofore described. The outwardly swung position of shutter member 29d has been illustrated in dot-dash lines. Naturally, the same kind of hinged mounting may be used for the cone 18 of FIGS. 1–3 or for the shutter 29b of FIGS. 7 and 8; conversely, member 29d or cone 18 could also be fitted onto the associated trap body merely by friction, in the manner illustrated for member 29d. Additional closure means, such as the inflatable blades 29a of FIGS. 5 and 6, could, of course, also be provided inside the ring 25d.

Further modifications or combinations of features are believed to be readily apparent to persons skilled in the art and are intended to be embraced within the spirit and scope of the appended claims.

I claim:

1. A fisherman's gear comprising, in combination, a fishing rod having a proximal end to be held by the fisherman and a distal end remote from the fisherman, a line extending along said rod beyond said distal end, and a fish trap slidable along said rod and said line past said distal end, said trap having a one-way inlet for fish on the side facing away from said proximal end, said trap being removable from said rod and repositionable thereon by way of said end.

2. A fisherman's gear as defined in claim 1 wherein said trap is provided with fastening means for attaching it to a fisherman's belt.

3. A fisherman's gear as defined in claim 1 wherein said trap is provided, on its side facing the fisherman, with closure means removable for facilitating introduction of said proximal end into said trap.

4. A fisherman's gear as defined in claim 3 wherein said closure means comprises inflatable wall means.

5. A fisherman's gear as defined in claim 3 wherein said closure means comprises a mechanical shutter.

6. A fisherman's gear as defined in claim 1 wherein said trap has a collapsible body of generally cylindrical shape.

7. A fisherman's gear as defined in claim 6 wherein said body is inflatable.

8. A fisherman's gear as defined in claim 6 wherein said body is telescoped.

9. A fisherman's gear as defined in claim 6 wherein said body is accordion-pleated.

10. A fisherman's gear as defined in claim 1 wherein said trap is provided with inwardly yieldable flaps normally obstructing said inlet.

11. A fisherman's gear as defined in claim 1 wherein said trap is provided with an outwardly diverging extension beyond said inlet.

12. A fisherman's gear as defined in claim 11 wherein said extension has a perforated frustoconical wall.

13. A fisherman's gear as defined in claim 11, further comprising an annular weight slidable along said said rod and said line onto said trap for loading down said inlet.

14. A fisherman's gear comprising, in combination, a fishing rod having a proximal end to be held by the fisherman and a distal end remote from the fisherman, a line extending along said rod beyond said distal end, a fish trap slidable along said rod and said line past said distal end, said trap having a one-way inlet for fish on the side facing away from said proximal end, said trap being removable from said rod and repositionable thereon by way of said proximal end, and a flexible link connecting said trap with a fisherman's belt, said trap being attachable to said belt upon its removal from said rod and line.

References Cited

UNITED STATES PATENTS

| | | | |
|---|---|---|---|
| 1,269,623 | 6/1918 | Logsdon | 43—65 |
| 1,797,251 | 3/1931 | Tyrrell | 43—5 |
| 2,626,477 | 1/1953 | Richardson | 43—5 |

FOREIGN PATENTS

| | | |
|---|---|---|
| 1,322,348 | 2/1963 | France. |
| 1,350,981 | 12/1963 | France. |

SAMUEL KOREN, *Primary Examiner.*

WARNER H. CAMP, *Examiner.*